US008155578B2

(12) United States Patent
Cody

(10) Patent No.: US 8,155,578 B2
(45) Date of Patent: Apr. 10, 2012

(54) METHOD AND SYSTEM FOR GENERATING AND PROCESSING AN ASSESSMENT EXAMINATION

(75) Inventor: Preston Cody, San Antonio, TX (US)

(73) Assignee: Educational Testing Service, Princeton, NJ (US)

( * ) Notice: Subject to any disclaimer, the term of this patent is extended or adjusted under 35 U.S.C. 154(b) by 1260 days.

(21) Appl. No.: 10/951,068

(22) Filed: Sep. 27, 2004

(65) Prior Publication Data
US 2005/0255439 A1    Nov. 17, 2005

Related U.S. Application Data

(60) Provisional application No. 60/571,021, filed on May 14, 2004.

(51) Int. Cl.
*G09B 7/00* (2006.01)
*G06K 7/00* (2006.01)

(52) U.S. Cl. ........ 434/358; 434/353; 434/363; 382/321; 382/311

(58) Field of Classification Search .................. 434/353, 434/354, 363, 358; 235/436; 381/182, 321; 358/1.4, 1.9; 382/321, 311, 317
See application file for complete search history.

(56) References Cited

U.S. PATENT DOCUMENTS

| | | | | |
|---|---|---|---|---|
| 4,217,487 A | * | 8/1980 | Kjeer | ........................... 235/468 |
| 4,978,305 A | | 12/1990 | Kraft | |
| 5,011,413 A | * | 4/1991 | Ferris et al. | .................... 434/358 |
| 5,134,669 A | * | 7/1992 | Keogh et al. | ................. 382/318 |
| 5,321,611 A | | 6/1994 | Clark et al. | |
| 5,433,615 A | | 7/1995 | Clark | |
| 5,437,554 A | | 8/1995 | Clark et al. | |
| 5,458,493 A | | 10/1995 | Clark et al. | |
| 5,466,159 A | | 11/1995 | Clark et al. | |
| 5,558,521 A | | 9/1996 | Clark et al. | |
| 5,672,060 A | | 9/1997 | Poor | |

(Continued)

FOREIGN PATENT DOCUMENTS

WO    WO 2005/114614 A2    12/2005

OTHER PUBLICATIONS

International Search Report of PCT Application No. PCT/US2005/016742, Mar. 14, 2008, 4 pages.

(Continued)

*Primary Examiner* — Xuan Thai
*Assistant Examiner* — Peter Egloff
(74) *Attorney, Agent, or Firm* — Jones Day

(57) ABSTRACT

Methods and systems for generating and processing an assessment examination answer sheet are disclosed. An answer sheet is formatted by question, column or section using a layout tool and includes calibration marks, and examinee and examination identifiers. The format is stored in a computer-readable form, such as an XML file. A conventional printer prints the answer sheet prior to a test administration. Upon completion, a scanned image of the answer sheet is produced using a conventional scanner. The calibration marks are used to determine relative positions of answer sheet elements and to determine light and dark answer values. The examinee and examination identifiers identify the examinee and the proper stored format. Automatic grading ensues. A graphical user interface ("GUI") assists grading of the answer sheet. The GUI may use confidence level indicators to denote answer choices or questions for which the grading system cannot precisely determine the intended response.

24 Claims, 15 Drawing Sheets

U.S. PATENT DOCUMENTS

| | | | |
|---|---|---|---|
| 5,690,497 A | | 11/1997 | Clark et al. |
| 5,709,551 A | | 1/1998 | Clark et al. |
| 5,711,673 A | * | 1/1998 | Grundy, Jr. .................. 434/353 |
| 5,716,213 A | | 2/1998 | Clark et al. |
| 5,718,591 A | | 2/1998 | Clark et al. |
| 5,735,694 A | | 4/1998 | Clark et al. |
| 5,752,836 A | | 5/1998 | Clark et al. |
| 5,775,918 A | * | 7/1998 | Yanagida et al. ............. 434/353 |
| 5,987,149 A | | 11/1999 | Poor |
| 5,987,302 A | | 11/1999 | Driscoll et al. |
| 5,991,595 A | | 11/1999 | Romano et al. |
| 6,079,624 A | * | 6/2000 | Apperson et al. ............. 235/494 |
| 6,120,299 A | | 9/2000 | Trenholm et al. |
| 6,234,806 B1 | * | 5/2001 | Trenholm et al. ............. 434/322 |
| 6,267,601 B1 | | 7/2001 | Jongsma et al. |
| 6,652,287 B1 | | 11/2003 | Strub et al. |
| 6,741,724 B1 | * | 5/2004 | Bruce et al. .................. 382/101 |
| 6,751,351 B2 | * | 6/2004 | Knowles et al. ............. 382/181 |
| 6,816,702 B2 | | 11/2004 | Kuntz et al. |
| 7,068,861 B2 | * | 6/2006 | Swanson et al. ............. 382/321 |
| 7,298,902 B2 | | 11/2007 | Cichielo et al. |
| 2005/0037326 A1 | | 2/2005 | Kuntz et al. |

OTHER PUBLICATIONS

International Search Report dated Mar. 14, 2008 from corresponding International Patent Application No. PCT/US2005/016742.
Written Opinion of the International Searching Authority dated Mar. 14, 2008 from Corresponding International Patent Application No. PCT/AU2005/016742.

* cited by examiner

Demonstration Exam — Smith, John

Section 1

1. A B C D E    7. A B C D E    13. A B C D E
2. A B C D E    8. A B C D E    14. A B C D E
3. A B C D E    9. A B C D E    15. A B C D E
4. A B C D E    10. A B C D E   16. A B C D E
5. A B C D E    11. A B C D E   17. A B C D E
6. A B C D E    12. A B C D E   18. A B C D E

Section 2

```xml
- <Form name="HED Demo" id="10019" cornerpointangle="0.6459044106117425">
  - <Field name="All Fields" fieldtype="com.ets.imr.core.FieldGroup" sequence="0"
      x="-0.010396975" y="0.01" w="1.000397" h="0.99775743">
    <Field name="FIRST_CORNER_POINT" fieldtype="CornerPoint" sequence="1"
        x="0.01" y="0.01" w="0.15" h="0.1" />
    <Field name="SECOND_CORNER_POINT" fieldtype="CornerPoint" sequence="2"
        x="0.84" y="0.89" w="0.15" h="0.1" />
  + <Field name="FORM_ID_BINARY_FIELD" fieldtype="BinaryData" sequence="3"
      x="-0.010396975" y="0.89492244" w="0.052930057" h="0.11283499">
  + <Field name="STUDENT_ID_BINARY_FIELD" fieldtype="BinaryData" sequence="4"
      x="-0.010396975" y="0.78208745" w="0.052930057" h="0.11283499">
    <Field name="BLANK_CALIBRATOR" fieldtype="MarkIntensity" sequence="5"
        x="-0.010396975" y="0.7538787" w="0.032136105" h="0.018335683" />
    <Field name="MARK_CALIBRATOR" fieldtype="MarkIntensity" sequence="6"
        x="-0.010396975" y="0.73272216" w="0.032136105" h="0.018335683" />
  - <Field name="Items" fieldtype="com.ets.imr.core.FieldGroup" sequence="7"
      x="0.13705105" y="0.17700987" w="0.7731569" h="0.39774328">
    - <Field name="Reading" fieldtype="com.ets.imr.core.FieldGroup" sequence="1"
        x="0.13705105" y="0.17700987" w="0.7731569" h="0.39774328"
      - <Field name="1" fieldtype="MultipleChoice" sequence="0" x="0.13705105"
          y="0.17700987" w="0.16068053" h="0.018335685">
        <Field name="A" fieldtype="MarkIntensity" sequence="0" x="0.13705105"
            y="0.17700987" w="0.032136105" h="0.018335683" />
        <Field name="B" fieldtype="MarkIntensity" sequence="1" x="0.16918714"
            y="0.17700987" w="0.032136105" h="0.018335683" />
        <Field name="C" fieldtype="MarkIntensity" sequence="2" x="0.20132326"
            y="0.17700987" w="0.032136105" h="0.018335683" />
        <Field name="D" fieldtype="MarkIntensity" sequence="3" x="0.23345935"
            y="0.17700987" w="0.032136105" h="0.018335683" />
        <Field name="E" fieldtype="MarkIntensity" sequence="4" x="0.26559547"
            y="0.17700987" w="0.032136105" h="0.018335683" />
        </Field>
      - <Field name="2" fieldtype="MultipleChoice" sequence="1" x="0.13705105"
          y="0.21791255" w="0.16068053" h="0.018335685">
        <Field name="A" fieldtype="MarkIntensity" sequence="0" x="0.13705105"
            y="0.21791255" w="0.032136105" h="0.018335683" />
        <Field name="B" fieldtype="MarkIntensity" sequence="1" x="0.16918714"
            y="0.21791255" w="0.032136105" h="0.018335683" />
        <Field name="C" fieldtype="MarkIntensity" sequence="2" x="0.20132326"
            y="0.21791255" w="0.032136105" h="0.018335683" />
        <Field name="D" fieldtype="MarkIntensity" sequence="3" x="0.23345935"
            y="0.21791255" w="0.032136105" h="0.018335683" />
        <Field name="E" fieldtype="MarkIntensity" sequence="4" x="0.26559547"
            y="0.21791255" w="0.032136105" h="0.018335683" />
        </Field>
```

METHOD AND SYSTEM FOR GENERATING AND PROCESSING AN ASSESSMENT EXAMINATION

CLAIM OF PRIORITY

This application claims priority to U.S. Provisional Patent Application Ser. No. 60/571,021, filed May 14, 2004, entitled "Method and System for Generating and Processing an Assessment Examination," which is incorporated herein by reference in its entirety.

TECHNICAL FIELD

The present invention relates generally to the fields of assessment evaluation, administration and scoring. In particular, the invention relates to providing methods and systems for generating elements of an assessment examination answer sheet in human-readable and computer-readable formats. The invention further relates to methods and systems of processing a scanned image of an assessment examination answer sheet and providing confidence levels for evaluations of examinee responses.

BACKGROUND

Standardized testing is prevalent in the United States today. Such testing is used for higher education entrance examinations and achievement testing at the primary and secondary school levels. The prevalence of standardized testing in the United States has been further bolstered by the No Child Left Behind Act of 2001, which emphasizes nationwide test-based assessment of student achievement.

Traditional multiple-choice assessment examinations contain one or more sections, each including a series of questions. An assessment examination presents several answer choices (i.e., A, B, C, D, etc.) for each question. An examinee is instructed to determine the best answer from the set of choices and indicate his or her choice on an answer sheet. The answer sheet presents lists of answer areas. Each answer area pertains to one question and contains a row of answer spaces. Each answer space corresponds to one of the answer choices. A typical method for indicating an answer is to darken an answer space corresponding to the answer by marking it with a pencil. Changing an answer requires an examinee to erase the initial pencil mark in one space and to mark another. The spaces are typically either ovals or rectangles.

Traditional answer sheets have the advantage of being formatted in such a way that they are easily recognized by answer scanning machines. This is because traditional answer sheets are mass-produced and the layout of such sheets can be loaded into the scanning machine.

However, because traditional answer sheets are not customized to the assessment examination for which they are used, the number of spaces on an answer sheet for a given question often does not match the number of responses for that question. Moreover, additional answer areas or sections are often present on traditional answer sheets. Such additional areas, sections and/or spaces can confuse an examinee and lead to incorrectly marked answers.

In an effort to solve this problem, custom-designed answer sheets can be generated for particular assessment examinations. Such answer sheets may be designed to have the correct number of sections, answer areas and answer spaces for a given assessment examination. Typically, such answer sheets are not cost effective unless the number of examinees is large. Additionally, the creation of customized answer sheets requires expert skills in form design and software programming.

What is needed is a method and system for producing low cost custom-designed answer sheets for assessment examinations.

A further need exists for a method and system for automatically encoding an answer sheet with information identifying the examinee and/or the assessment examination.

A further need exists for a method and system for configuring image processing software to process such answer sheets having been scanned.

A further need exists for a method and system for providing a user interface to display the scanned image of the answer sheet to permit an evaluator to score an examination.

A further need exists for a method and system for evaluating the amount of confidence in the results of image processing and presenting this information to permit an evaluator to correct processing errors.

The present invention is directed to solving one or more of the above-listed problems.

SUMMARY

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the invention which will be limited only by the appended claims.

It must also be noted that as used herein and in the appended claims, the singular forms "a," "an," and "the" include plural references unless the context clearly dictates otherwise. Thus, for example, reference to an "assessment item" is a reference to one or more assessment items and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

The present invention is directed to methods and systems for generating and processing answer sheets for assessment examinations. Generating an answer sheet may include creating an answer sheet that is designed for a particular assessment examination. For example, the number of answer spaces on the answer sheet for a particular assessment item may be equivalent to the number of responses for that assessment item. Moreover, the answer sheet may only contain answer areas for a question if the question is present in the assessment examination. The answer areas on the answer sheets may be sub-divided into sections based on the format of the assessment items for the assessment examination.

In addition, markings may be placed on the answer sheet to assist in the determination of, for example, the boundaries of the answer sheet, the format of the answer sheet, the darkness of a completely filled or unfilled response and/or an examinee who used the particular answer sheet for the assessment examination. Each of these markings may assist in processing the answer sheet upon completion of the administration of the assessment examination. A computer-readable format for the exam may be generated to permit reproduction of the answer sheet by a computer.

The answer sheet may be printed, administered as part of an assessment examination and scanned into a computer-readable storage medium upon completion of the assessment examination. An image processing algorithm may use one or more of the marking described above to determine the format of the answer sheet, the location of the answer areas and the darkness level for any marks within the answer areas. Using this information, a score may be automatically generated for the answer sheet based on an answer key for the assessment examination. A graphical user interface may permit a test or system administrator to modify the one or more computer-determined responses based on the administrator's evaluation of the images scanned from the answer sheet into the computer-readable storage medium.

A confidence level may be generated for each potential answer space and the response for each assessment item. One or more types of designator may appear in the graphical user interface denoting, for example, low confidence levels. The test or system administrator may use such designators to more quickly evaluate responses which the present invention is unable to definitively provide an intended examinee response.

BRIEF DESCRIPTION OF THE DRAWINGS

Aspects, features, benefits and advantages of the embodiments of the present invention will be apparent with regard to the following description, appended claims and accompanying drawings where:

FIG. 2 depicts an exemplary annotated answer sheet for an assessment examination according to an embodiment.

FIG. 4 depicts a portion of an exemplary form document depicting an answer sheet according to an embodiment.

FIG. 7 depicts an exemplary answer sheet submitted in response to an assessment examination.

DETAILED DESCRIPTION

The present invention is directed to a method and system by which an assessment examination answer sheet is generated, processed and scored. The present invention is further directed to providing a confidence level for evaluation of an examinee's responses.

Figure 1:
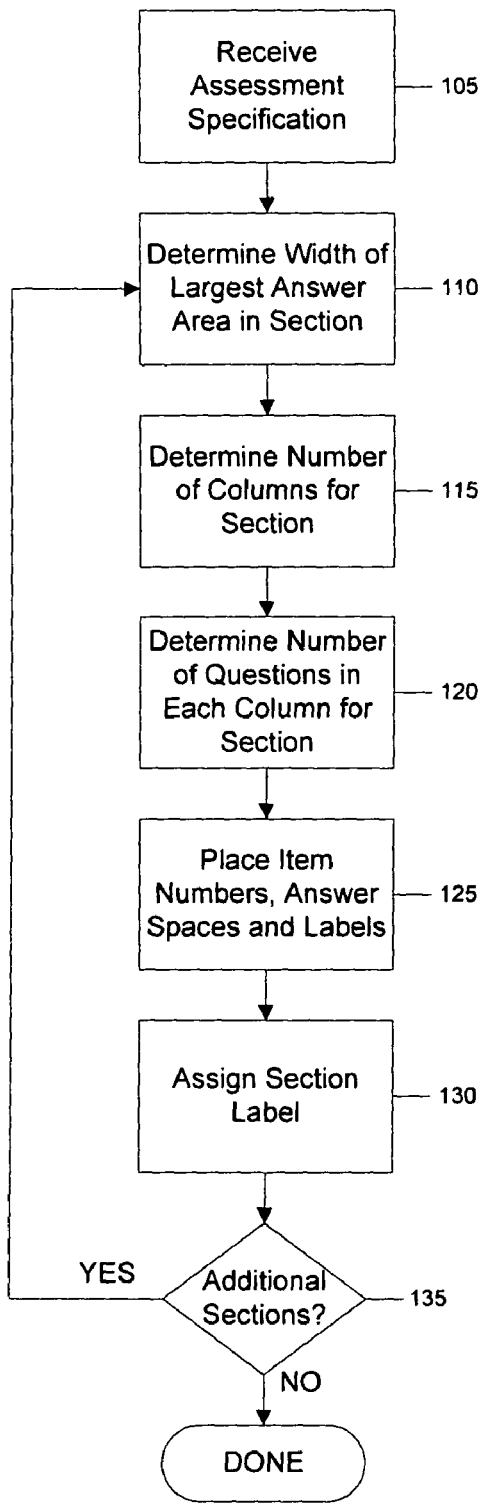
FIG. 1 depicts a flow diagram for an exemplary method for generating an assessment examination answer sheet according to an embodiment

FIG. 1 depicts a flow diagram for an exemplary method for generating an assessment examination answer sheet. Initially, information pertaining to the assessment examination may be received 105. In an embodiment, the information may include a name for the assessment examination, a number of sections, a number of questions for each section, and a number of potential responses for each question on the assessment examination. In an embodiment, the information is received from one or more of, for example, user entry, a database, an XML document and/or specifications from a web site.

Figure 2:
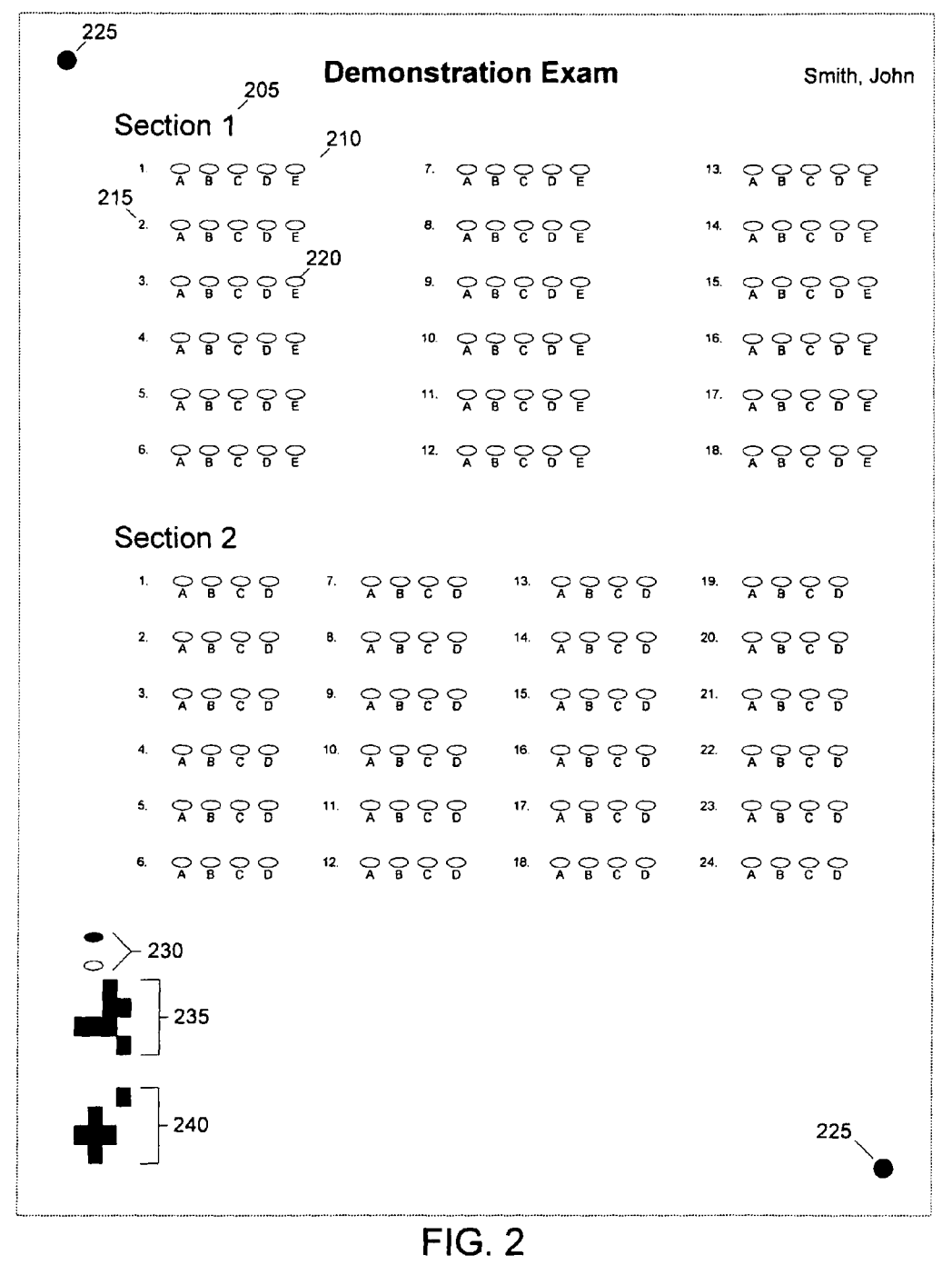

The generation of an assessment examination answer sheet according to an embodiment may require, for example, three sub-processes or modules. First, an answer document, such as the one depicted in FIG. 2, may be constructed using a Layout module. An answer document is an abstract representation of an answer sheet. The answer document may depict an arrangement of letters and shapes that can be rendered for printing and may correspond to a representation that a test administrator can view and understand. For example, on an assessment answer sheet, an answer area 210 may include a designator of the question number 215 to which the answer area 210 pertains (e.g., "2") and a plurality of answer spaces designating potential responses (e.g., "A," "B," "C," "D," etc.), such as, for example, 220. An assessment examination designer or examinee may be able to interpret how each answer space 220 corresponds to a potential response and that each answer space 220 corresponds to a particular question 210 by examining the answer sheet.

The Layout module may arrange the letters, numbers and shapes required for printing an answer sheet. Initially, the basic shapes used to recognize the parameters of the answer sheet when it is scanned in after an assessment examination is administered may be generated. These shapes may include corner marks 225, calibration marks 230 and/or identification encodings 235, 240 (as described below). After the basic shapes are laid out, the remainder of the answer document, including the answer areas 210, may be laid out. The answer areas 210 may be laid out in one or more sections 205, which may be defined one section at a time.

Referring back to FIG. 1, the Layout module may calculate 110 the width of the largest answer area 210 based on the number of answer spaces 220, the width of each answer space 220, the space between answer spaces 220, and the space for the item number 215. The Layout module may then compute 115 the number of columns that can be included within the horizontal margins of the answer document based on, for example, the width of the largest answer area 210. The number of answer areas 210 in each column may be determined 120 by dividing the total number of questions for the section 205 by the computed number of columns. This number may equal the number of rows for the section 205.

In an embodiment, each column of answer areas 210 may be the same width. In an alternate embodiment, each column of answer areas 210 may be sized to the width of the largest answer area 210 within that column. In such an embodiment, the number of columns may be iteratively determined.

A table may be generated with two sub-rows for each row. The sub-rows may include, for example, 1) the answer spaces 220 and 2) the answer designators ("A," "B," etc.) such that the answer designators are positioned beneath the answer spaces 220. In an alternate embodiment, the designator may be positioned within the answer space 220. The Layout module may then place 125 the letters, numbers and answer spaces 220 for a section 205 within the table. The section 205 may then be assigned 130 a label. Additional sections may be created 135 using a similar process.

In an embodiment, the Layout module may determine whether a section 205 can be placed within the vertical margin of the answer document. If the section 205 would not fit within the vertical margin, the Layout module may create a second page for the answer document to accommodate the section 205. In an alternate embodiment, the Layout module may print a portion of the section 205 on a first page for the answer document and the remainder of the section 205 on a second page for the answer document.

A Form module may be used to produce a form. A form is a logical description of an answer sheet that a computer can interpret to determine the location of answer areas 210, answer spaces 220, and other elements of the answer sheet. A form may include a plurality of fields. Each field may describe an area of interest of the answer sheet. The location of a field is determined by its relative position between the corner marks 225 on the answer sheet 305. In an embodiment, the center point of the answer sheet (i.e., halfway between the corner marks 225) may be designated as 0.5, 0.5. Using relative positions may permit automatic correction of stretch and skew within a scanned image.

A field may include a plurality of sub-fields. In an embodiment, a field corresponding to a multiple-choice question may contain a sub-field for each answer space 220. Each field may indicate which field processing component is used to process its value in the Processing module, described below in reference to FIGS. 11A and 11B. After the Layout module has laid out an answer sheet, a form may be generated automatically by analyzing the placement and purpose of each element within the answer document and generating a corresponding field. In an embodiment, the fields for the form are converted to XML and saved as an XML description of the form. The process for creating a form is described below.

A field that indicates a relative location of an answer space 220 may be generated for each answer space 220 within the answer document. The relative location of each answer space 220 may be calculated based on the location of the answer space 220 relative to the location of the corner marks 225. Each answer space 220 field may be assigned a name ("A," "B," "C," etc.) that, for example, matches the response selection and may be designated 310 as a Mark Intensity field. A Mark Intensity field may be processed based on the darkness of its answer space 220. Any response supplied by an examinee may register as darker intensity than an empty answer space 220.

A set of Mark Intensity fields corresponding to a particular assessment item may be aggregated and assigned to a corresponding field for that question. The assessment item field may be assigned a name ("1," "2," "3," etc.) that, for example, matches the item number 215 and may be designated 315 as a Multiple Choice field. A Multiple Choice field may be processed by examining the darkness of its sub-fields to determine which answer space 220 the examinee intended to select. A Multiple Choice field may be defined as an entire answer area 210.

A set of Multiple Choice fields for an entire section 205 may be aggregated 320 into a field representing the whole section. The field may be assigned a name matching the section name and may be designated as a Field Group. All section fields may then be aggregated 325 into a Field Group named "Items."

Additional fields may be defined for a form. For example, fields may be defined 330 for each of the corner marks 225, calibration marks 230 and/or identification encodings 235, 240 (described below). A Corner Mark field may define a wide area within which the Processing module searches for a corner mark 225. The search area is wide because the location of a corner mark 225 cannot be used to define the corner mark fields. Rather, the location of each corner mark 225 may be determined heuristically. The identification encoding fields may be designated as Binary Data fields.

A form containing all of the fields for an answer sheet may be assigned 335 an identifier. The answer sheet identifier and a description of its fields may be saved 340 within, for example, an XML document. The XML document may be stored in a computer-readable storage medium, such as a hard drive, a floppy disk, a CD, a DVD or the like. The XML document may be generated by converting each form and field object into an XML document object model.

A portion of an exemplary XML document produced according to an embodiment is depicted in FIG. 4. Each tag may represent one field. Sub-fields may be nested within corresponding fields. Each field may be designated within the XML document by, for example, its field type and/or its field name.

Figure 5:
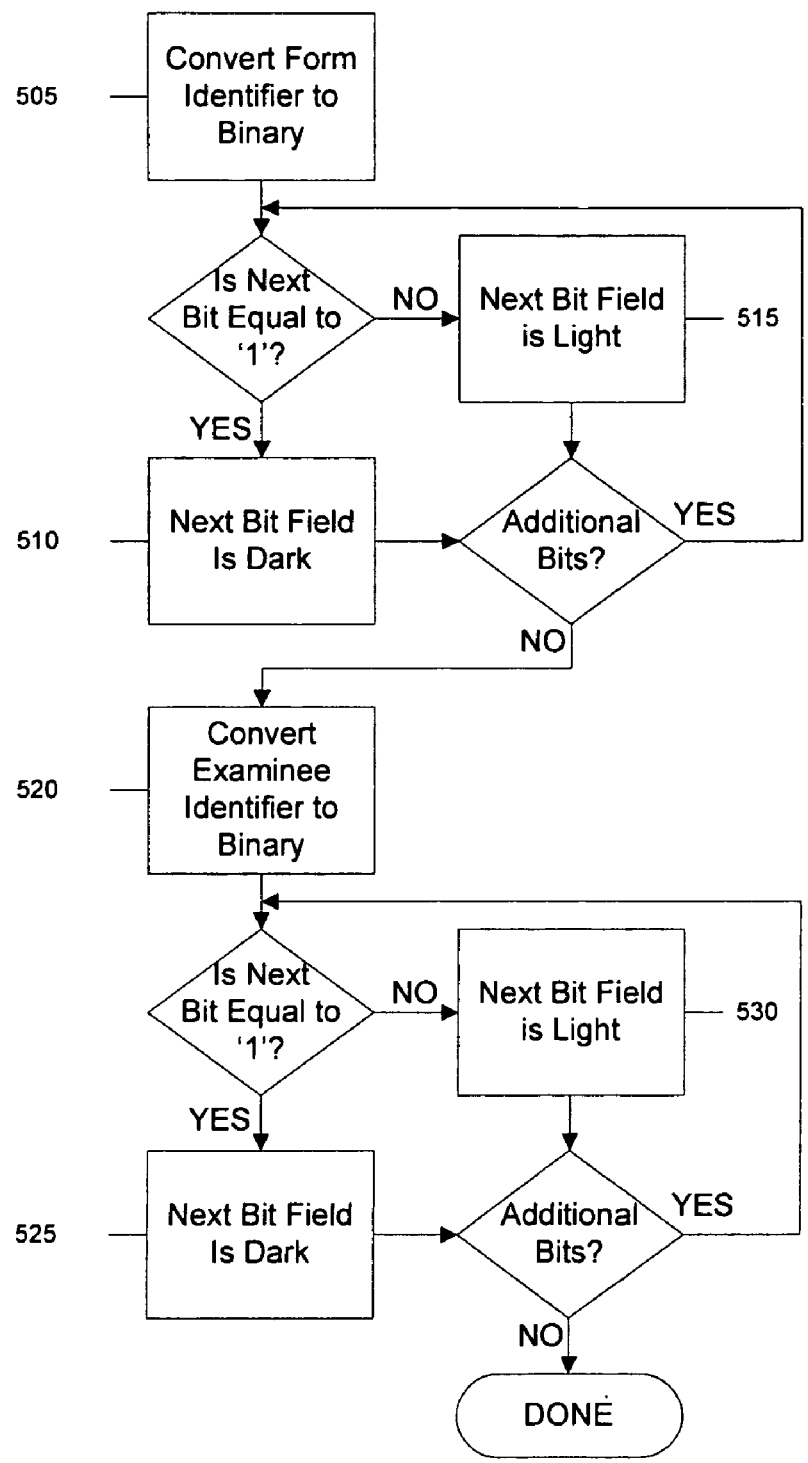
FIG. 5 depicts a flow diagram for an exemplary method for generating an assessment examination identification encoding according to an embodiment.

An Encoding module, depicted in FIG. 5, may encode identification information pertaining to the assessment examination and/or the examinee on the answer sheet. In an embodiment, the assessment examination form identifier 235 is used to inform the Processing module of the form to which the answer sheet pertains. In an embodiment, encoding an examinee identifier 240 on the answer sheet may assist with processing the answer sheet as well. If examinees are not known in advance of the administration of the assessment examination, the examinee identifier 240 may be excluded. In an alternate embodiment, the assessment examination form identifier ("the form identifier") 235 and/or the examinee identifier 240 may include a field of the answer sheet with a plurality of spaces in which an examinee may supply his identifying information.

Figure 6:
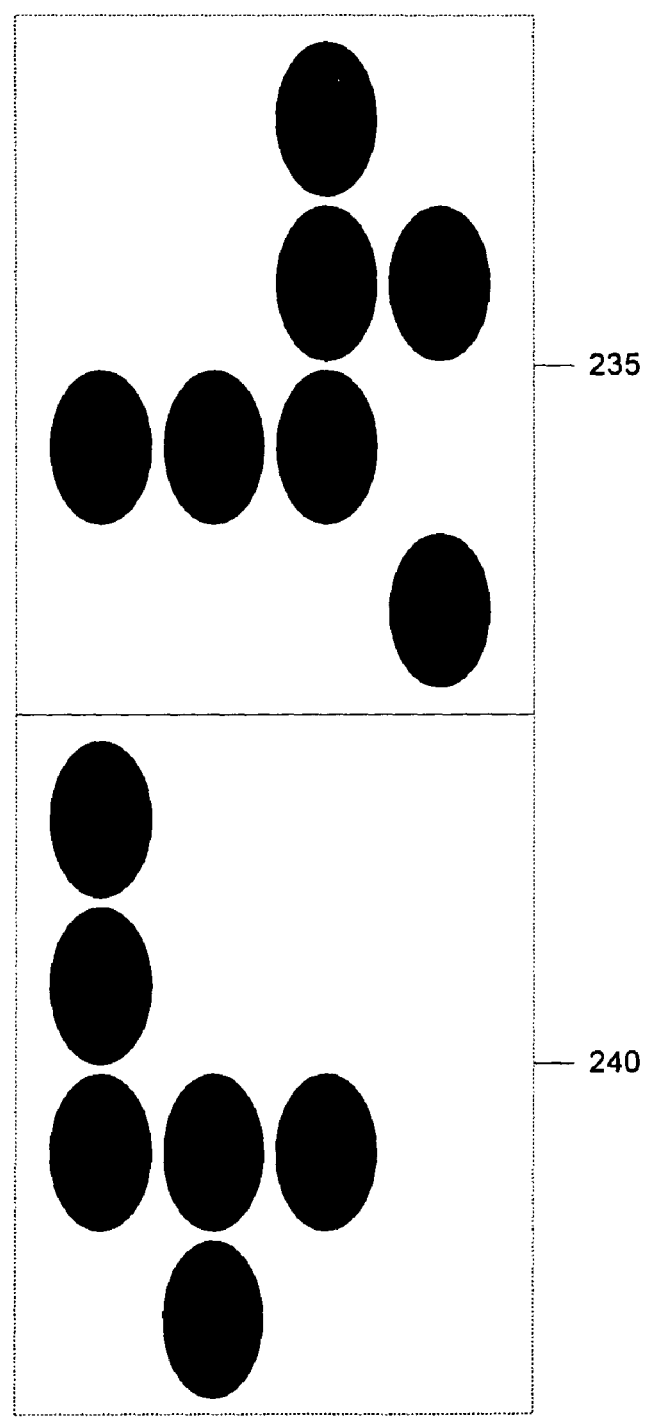
FIG. 6 depicts an exemplary identification encoding depicting a particular examinee and assessment examination according to an embodiment.

Identifiers 235, 240 may be encoded using binary fields. The binary field may include a plurality of Mark Intensity fields corresponding to the digital bits of the encoded identifiers. If a bit field is dark, it may be considered to be a '1.' If the bit field is light or empty, it may be considered to be a '0.' In an embodiment, the bit fields are arranged in a table having a plurality of rows and columns. The upper left field may correspond to the least significant digit. In an alternate embodiment, the upper left field may correspond to the most significant digit or a particular digit. Succeeding digits may flow across the rows and/or down the columns. Exemplary binary fields for a form identifier 235 and an examinee identifier 240 are shown in FIG. 6.

In an embodiment, preparing a printable answer sheet may include encoding the form identifier 235 into a binary field. The form identifier 235 may be converted 505 into binary (i.e., identifier #13 is converted to '1101'). The bit fields of the binary number may then be processed. If the next bit is equal to a '1,' the next bit field may be dark 510. If the next bit is equal to a '0,' the next bit field may be made light 515. Similarly, the examinee identifier 240 may be converted 520 into binary. The bits of the binary number may be processed. If the next bit is equal to a '1,' the next bit field may be dark 525. If the next bit is equal to a '0,' the next bit field may be made light 530. The examinee identifier 240 may differ for each answer sheet for an assessment examination depending upon the examinee. The above-described process may create a plurality of encoded printable answer sheets, which the Processing module may use to determine the assessment examination and examinee from a scanned image of the answer sheet. The answer sheets may then be printed and administered as part of an assessment examination.

Figure 7:
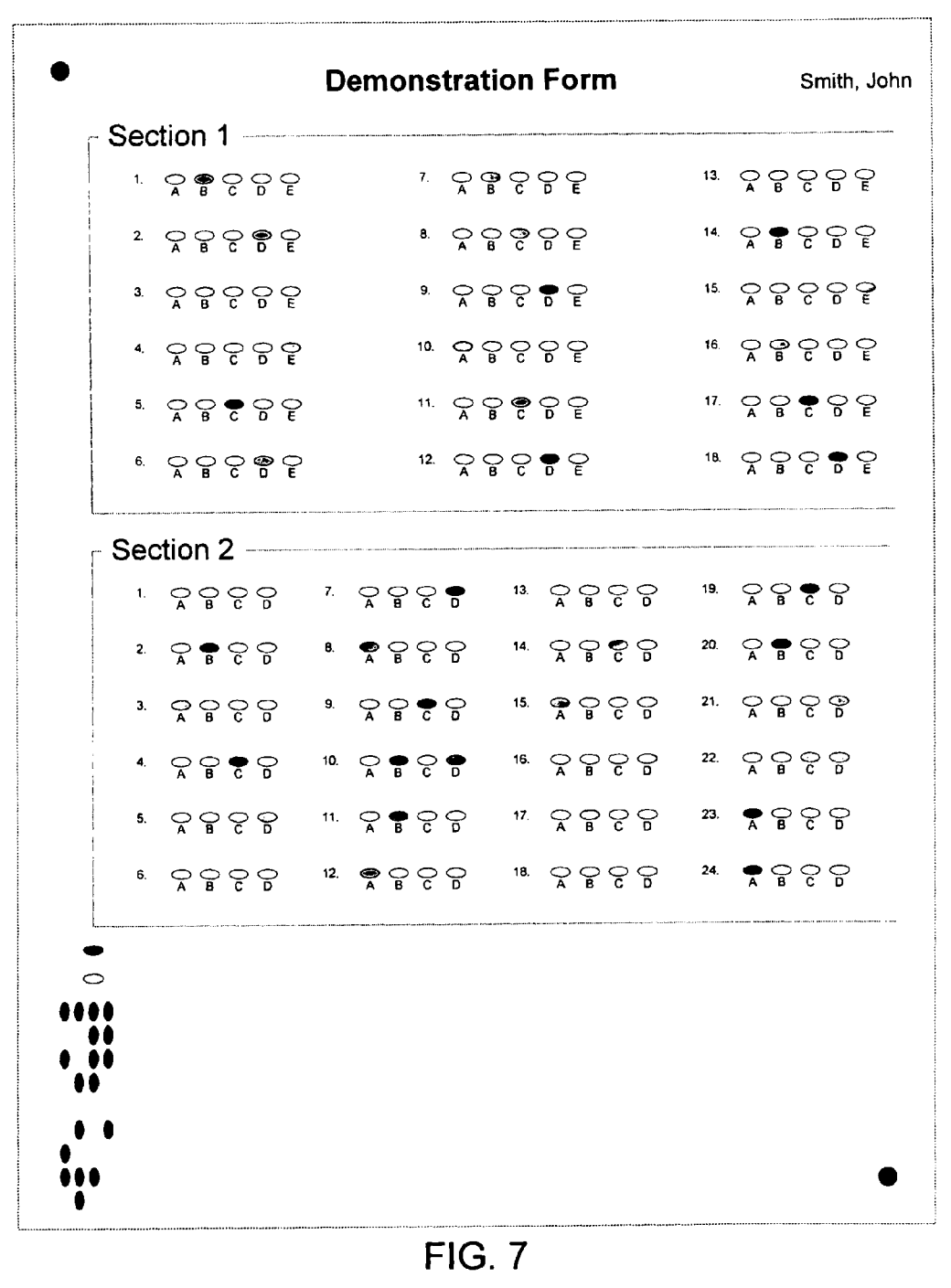

Upon completion of the administration of the assessment examination, one or more answer sheets, such as the one depicted in FIG. 7, may be scanned and stored in a computer-readable storage medium. Image processing may then be performed on the scanned image.

Figure 8:
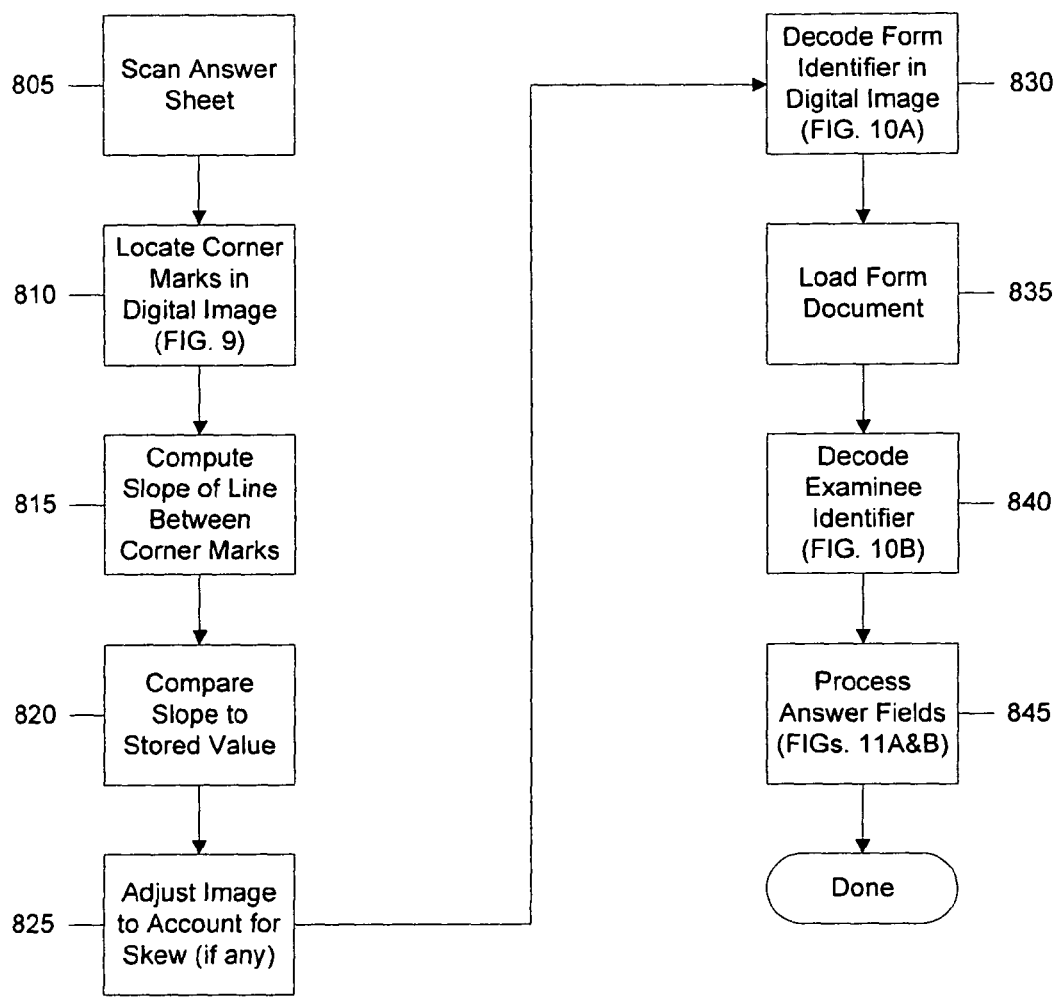
FIG. 8 depicts a flow diagram for an exemplary method for scanning and processing an assessment examination answer sheet according to an embodiment.

An exemplary process for performing image processing according to an embodiment is depicted in FIG. 8. Initially, an answer sheet may be scanned 805 using, for example, a scanner. The algorithms for processing a scanned image of an answer sheet may be sub-divided into one or more modules. In an embodiment, a Registration module may register a scanned image of an answer sheet. The scanned image of the answer sheet may be rotated to some degree as a result of the scanning process. In an embodiment, the corner marks 225 printed on the answer sheet may be used as anchors to establish the orientation of the page. In an embodiment, the location of each corner mark 225 must first be determined 810 by analyzing the pixels within an area that corresponds to the approximate center of the corner mark 225.

Figure 9:
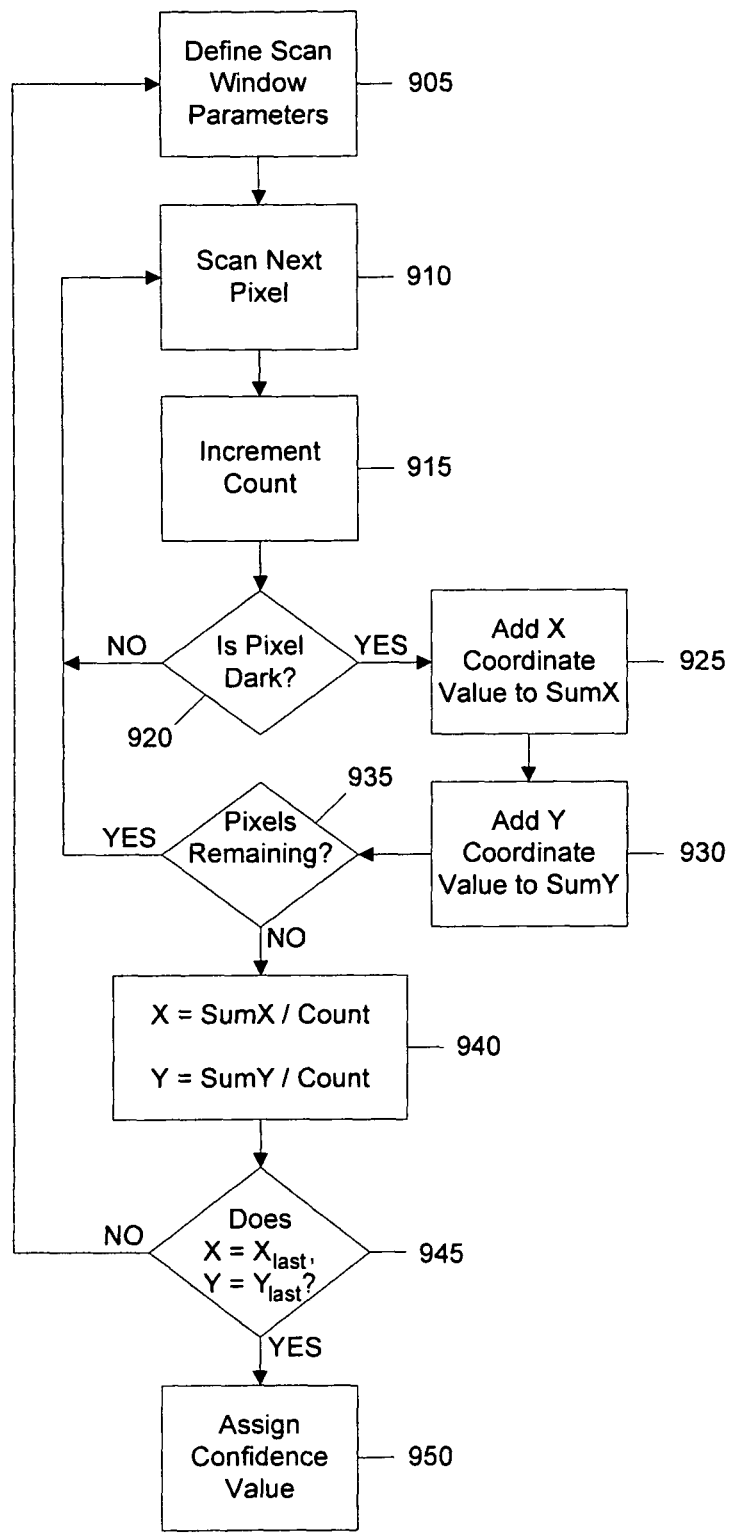
FIG. 9 depicts a flow diagram for an exemplary method of locating a corner mark according to an embodiment.

A method for determining the location of a corner mark 225 is described with reference to FIG. 9. In an embodiment, the Registration module may scan 910 each pixel within a defined window 905. A pixel count may be incremented for each pixel 915. When a dark pixel is encountered 920, the x coordinate for the pixel may be added 925 to a running total for the x coordinates for all dark pixels, and the y coordinate for the pixel may be added 930 to a running total for the y coordinates for all dark pixels. If no additional pixels remain to be checked 935 within the window, the sums for the x and y coordinates are divided 940 by the number of dark pixels encountered within the window. This value may correspond to the center of the corner mark 225.

The reason why this algorithm determines the center of the corner mark 225, assuming that all dark pixels are part of the corner mark 225, is as follows. Suppose a horizontally and vertically symmetrical shape, such as a circle is centered on the point where (x,y)=(1,1) with a radius of length 1. The circle's leftmost point would be (0,1), the rightmost would be (2,1), the topmost would be (1,2) and the bottommost would be (1,0). Adding the X values for these four points results in (0+2+1+1)=4. Similarly, adding the Y values for these four points results in (1+1+2+0)=4. Dividing each of these values by the number of points results in (1,1) (i.e., the center of the circle). In fact, it may be shown that the average of all points of a horizontally and vertically symmetrical shape is the center of the shape.

Presumably, each dark pixel is part of a corner mark 225; however, other dark pixels, such as errant pencil marks or shadows from the edge of the answer sheet, may also be captured. These extraneous dark pixels may skew the calculation of the center of the corner mark 225. To counter the likelihood of a miscalculation caused by such pixels, a second analysis may be performed using a narrower window centered on the computed center from the previous analysis. Each pixel may again be examined, and running totals of the x and y coordinates of the dark pixels may be generated. Averaging the running totals may produce a new data point for the center of the corner mark 225. If the first pass and the second pass produce the same coordinates for the center point 945, it may be safely assumed that the center point has been determined. If the values differ, the Registration module may iteratively narrow the window 905 around the newly computed value for the center of the corner mark 225. If the center point is determined on the second pass, a high confidence value as to where the corner mark 225 is positioned may be assigned 950. If the center point is not determined within a predetermined number of iterations, the Registration module may assign a low confidence value as to where the corner mark 225 is positioned.

Referring back to FIG. 8, the above analysis is performed 810 for each corner mark 225. Once the positions of the corner marks 225 are determined 810, the slope of a line connecting the corner marks 225 is computed 815. A stored value for the slope between the corner marks 225 may be compared 820 to the computed slope to determine if the scanning process rotated the image. Adjustments for rotational skew may be made 825 according to trigonometric calculations known by those of ordinary skill in the art.

When analyzing a scanned image for a field, a sub-image may be extracted from the master image that corresponds with the relative bounds of the field. As described above in the answer sheet generation process, each field may indicate its relative position between the corner marks 225.

A Decoding module may then determine 830 the form identifier 235 and/or examinee identifier 240 based on their field locations with respect to the corner marks 225. The form identifier 235 may be located in a fixed position with respect to the corner marks 225 for all answer sheets. Accordingly, the Registration module need not know the type of answer sheet it is processing prior to determining the location of the form identifier 235.

Figure 3:
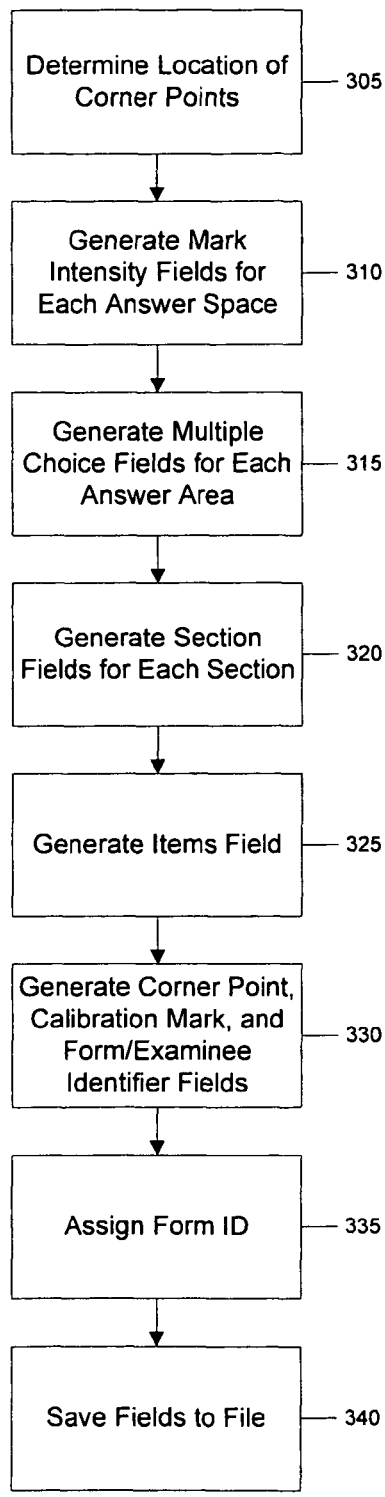
FIG. 3 depicts a flow diagram for an exemplary method for generating an assessment examination form document according to an embodiment.
Figure 10A:
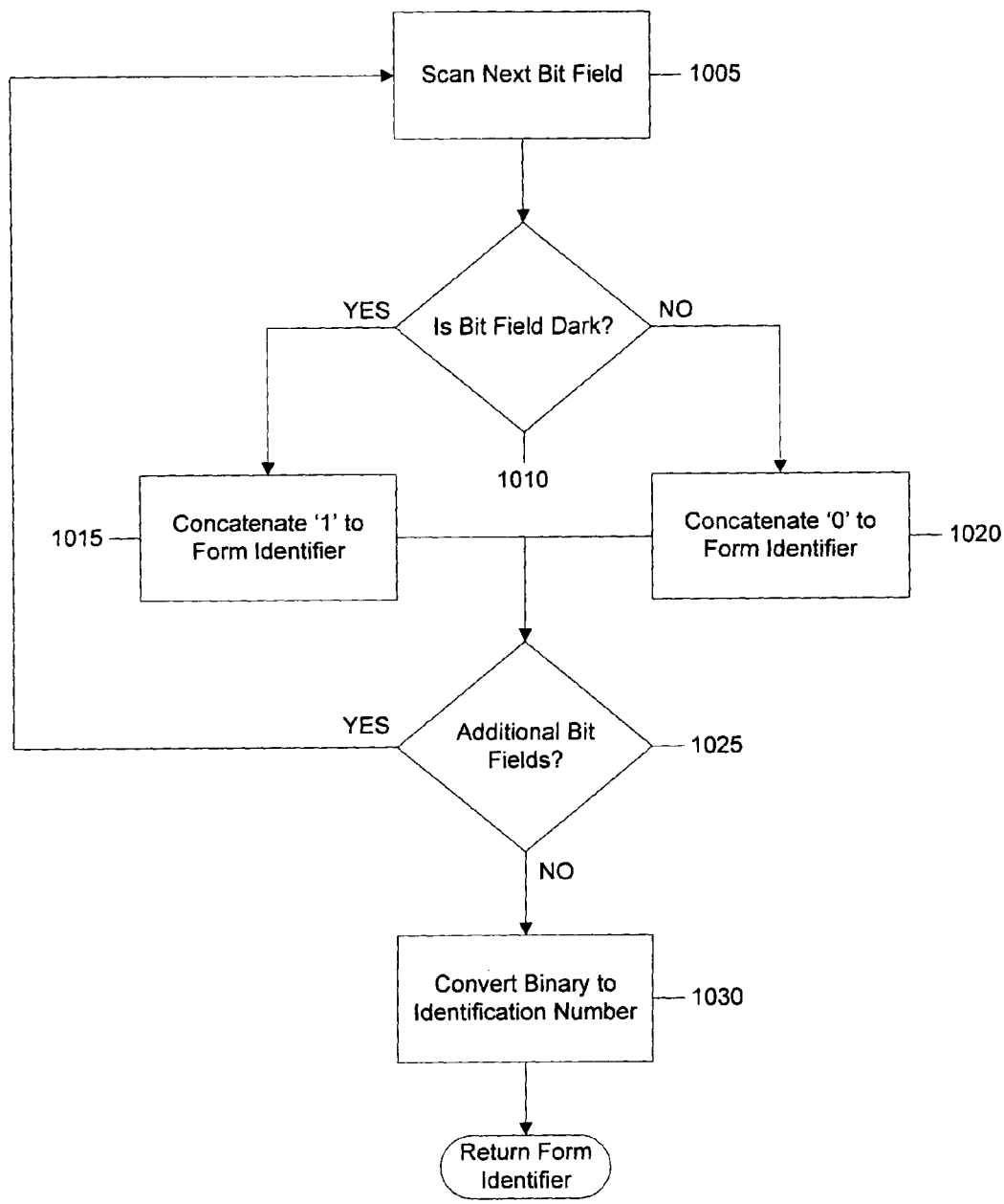
FIG. 10A depicts a flow diagram for an exemplary method of decoding a form identifier from an answer sheet according to an embodiment

FIG. 10A depicts a flow diagram for an exemplary method of decoding a form identifier 235 from an answer sheet according to an embodiment. For the form identifier field, a next bit field is cropped and extracted 1005. A determination of whether a bit is dark or light is made 1010 based on the extracted pixels. If the bit is considered to be dark, a '1' may be concatenated 1015 to a form identifier. Otherwise, a '0' may be concatenated 1020 to the form identifier. A determination of whether additional bit fields remain is then made 1025. If additional bits remain, the next bit field is cropped and extracted 1005. This process may generate a binary sequence of 1's and 0's that, when completed, may be used to identify the form and load 835 the Form description from a computer-readable storage medium. In an embodiment, the binary sequence may be converted 1030 to a decimal number prior to identifying the form. In an embodiment, the Form description may be an XML document generated by the Form module, as described above in reference to FIG. 3.

Figure 10B:
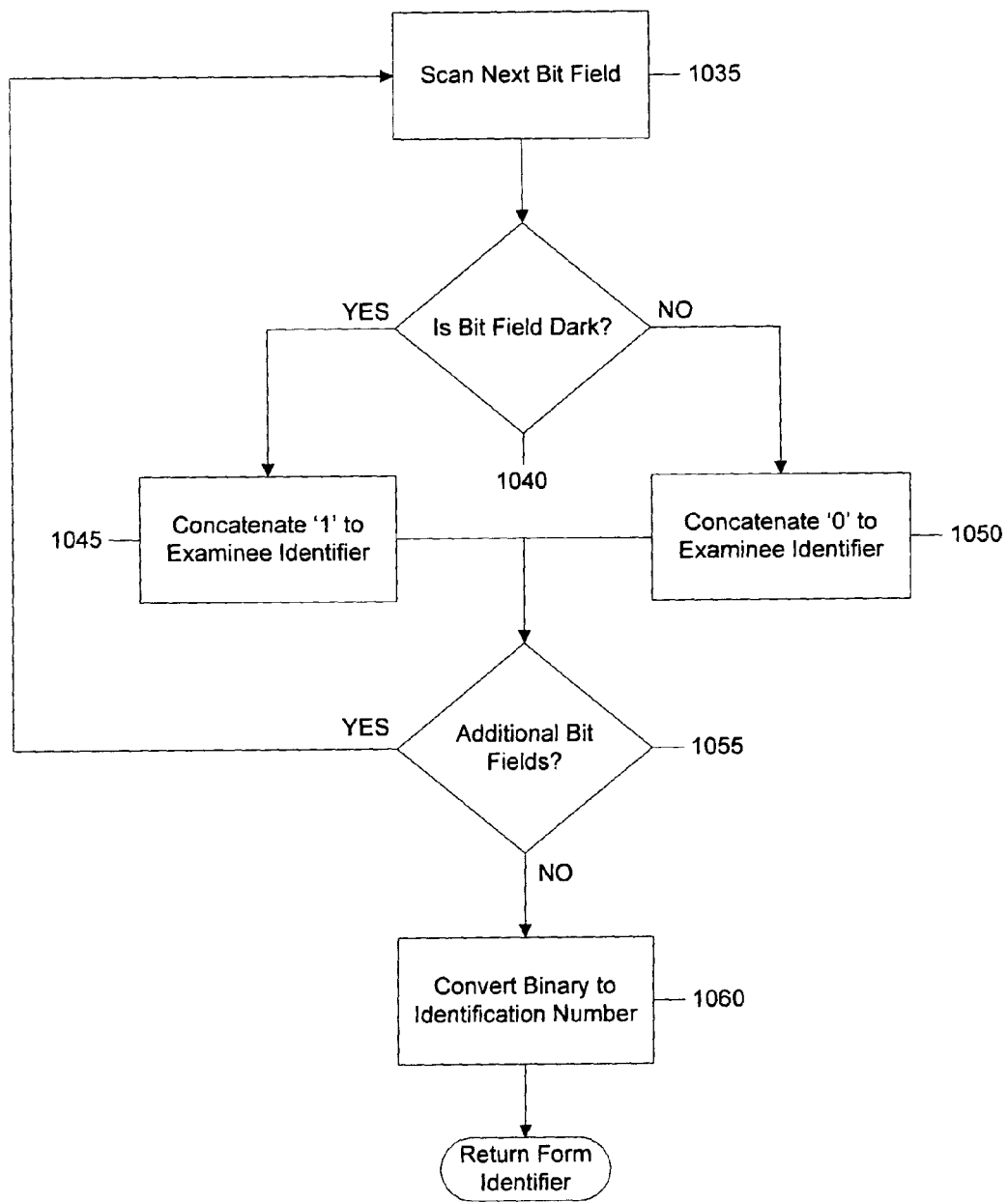
FIG. 10B depicts a flow diagram for an exemplary method of decoding an examinee identifier from an answer sheet according to an embodiment.

FIG. 10B depicts a flow diagram for an exemplary method of decoding an examinee identifier 240 from an answer sheet according to an embodiment. For the examinee identifier field, a next bit field is cropped and extracted 1035. A determination of whether a bit is dark or light is made 1040 based on the extracted pixels. If the bit is considered to be dark, a '1' may be concatenated 1045 to an examinee identifier. Otherwise, a '0' may be concatenated 1050 to the examinee identifier. A determination of whether additional bit fields remain is then made 1055. If additional bits remain, the next bit field is cropped and extracted 1035. This process may generate a binary sequence of 1's and 0's that, when completed, may be used to identify 840 the examinee. In an embodiment, the binary sequence may be converted 1060 to a decimal number prior to identifying the examinee.

Once the Registration module determines the form 235 and/or examinee identifiers 240, a Processing module may process 845 each field within the Form document. Each field may describe the relative location (x,y) and the bounds (width, height) of the object it represents. It may also indicate its type (e.g., Mark Intensity, Multiple Choice, etc.). The type may correspond to a class of objects that have similar properties and/or that the Processing module processes similarly.

Figure 11A:
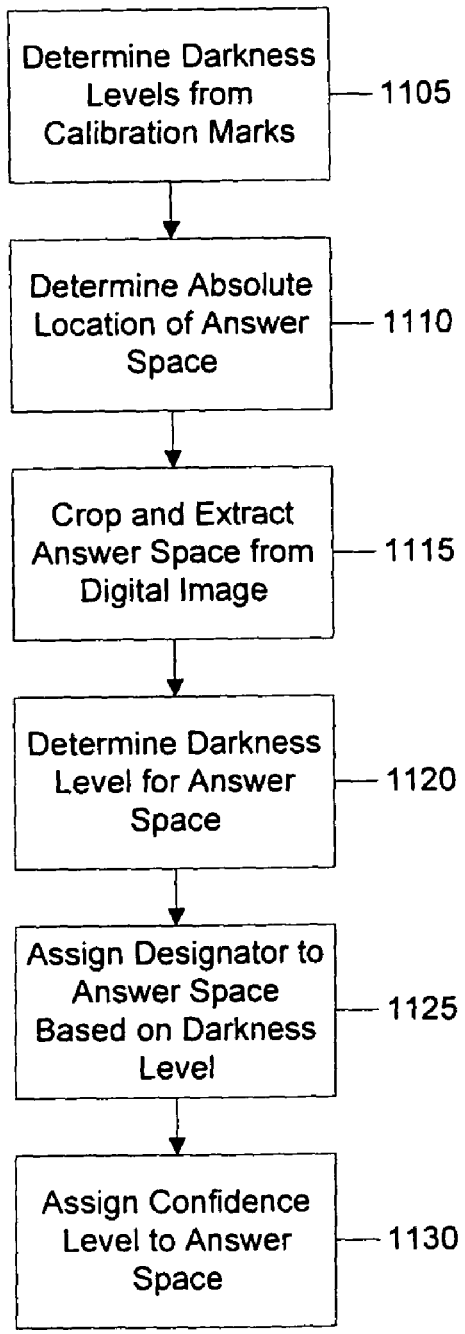
FIG. 11A depicts a flow diagram for an exemplary method of processing an answer space according to an embodiment.
Figure 11B:
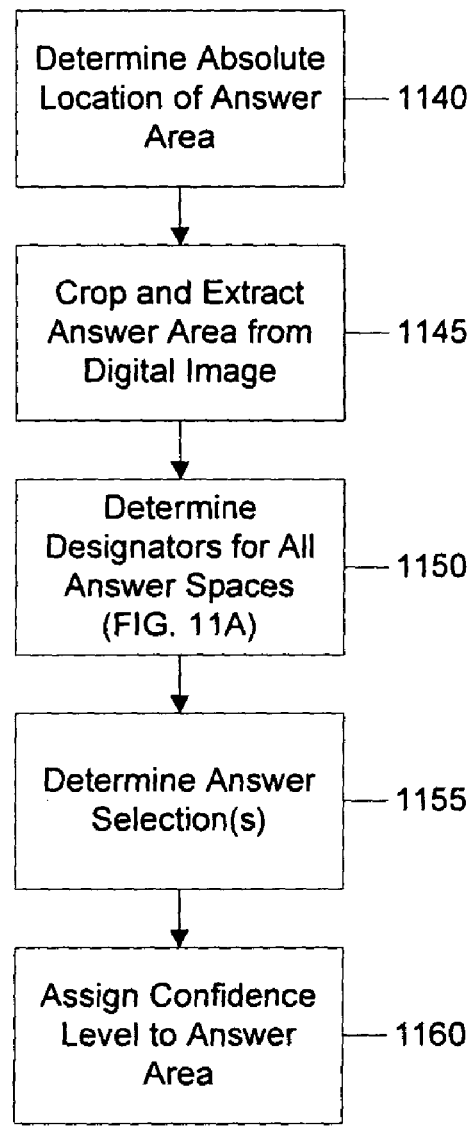
FIG. 11B depicts a flow diagram for an exemplary method of processing an answer area according to an embodiment.

The method of processing a field is described in detail with reference to FIGS. 11A and 11B. As each field is processed, the set of pixels for that field may be cropped from the scanned image and analyzed. The field types may include calibration marks 230 (light and dark), which simulate the coloration of selected answer areas and unselected answer areas.

Initially, the calibration marks 230 may be processed 1105 as Mark Intensity fields to determine the normal value of an empty answer area as compared to the normal value of a selected answer area. The absolute location of a field may then be determined. In an embodiment, the field is defined by its relative position and bounds, such as in FIG. 4. Each of the relative position and bound values may be assigned values relative to the corner marks 225. Thus, the relative values for the field may be used to compute the absolute positions of the relevant pixels within the scanned image in such an embodiment. A method for computing an absolute location for a field from its relative values is described below.

In an embodiment, the x and y values assigned to the field may indicate the relative position of the upper left corner of the field within the scanned image. Thus, the absolute x position of the upper left corner may be equal to the sum of 1) the relative x value for the field multiplied by the horizontal distance between the corner marks 225 and 2) the x position of the upper left hand corner mark 225. A similar computation is performed for the absolute y value of the field using the vertical distance between the corner marks 225. The resulting values may equal the absolute (x,y) position of the field's upper left corner.

The width and height of the image may be calculated by multiplying the relative width and height values for the field by the horizontal and vertical distances between the corner marks 225, respectively. Trigonometric adjustments may correct for any rotational skew of the image. The resulting absolute position and bounds may be used to crop the region that corresponds with the field. The field type of the field may be used to determine how the cropped image is analyzed.

The algorithms for analyzing two types of fields will now be discussed. Referring back to FIG. 11A, the absolute location of a Mark Intensity field for an answer space 220 may be computed 1110 using the algorithm described above. The Mark Intensity field for the answer space 220 may be cropped and extracted 1115 from the digital image. The processing of a Mark Intensity field may include averaging the pixel values to determine 1120 an intensity level corresponding to the darkness of the answer space 220. The calibration marks 230 (discussed above) may be used to determine 1105 the darkness levels associated with empty and filled answer spaces 220. Processing each Mark Intensity field may include assigning 1125 a designator to the answer space 220 denoting whether the answer space 220 is, for example, Marked, Empty or an Erasure. In an embodiment, if the Mark Intensity field has a darkness level close to the calibrated value of the empty calibration mark 230, the field may be considered Empty. In an embodiment, if the field has a darkness level close to the calibrated value of the filled calibration mark 230, the field may be considered Marked. A field with an intermediate darkness level may be considered an Erasure. The Processing module may denote an Erasure when, for example, an examinee erases a mark, a light mark is entered, and/or a stray mark passes through an answer space 220. After assigning the appropriate designator, a confidence level may be assigned 1130 to the answer space 220. A description of the meaning of the confidence level is described below.

The second field for which processing is discussed is the Multiple Choice field. The method of processing a Multiple Choice field is depicted in FIG. 11B. Initially, the absolute location for the Multiple Choice field (i.e., an answer area 210) is determined 1140. The answer area 210 may then be cropped and extracted 1145 from the digital image. Multiple Choice fields may include a plurality of Mark Intensity fields, such as one for each potential response. The processing of a Multiple Choice field may attempt to determine 1155 which answer space 220 the examinee intended to select by evaluating 1150 the designators assigned to each answer space 220. This may often be a simple determination. For example, if one of the Mark Intensity fields associated with a Multiple Choice field is considered to be Marked and all other Mark Intensity fields are considered to be Empty, the Processing module may select the Marked field as the examinee's intended selection. If all Mark Intensity fields are Empty, the Processing module may determine that the examinee skipped the question associated with the Multiple Choice field.

In other cases, the determination of the examinee's intended selection may depend on the rules for the assessment examination. The rules may be adjusted depending upon the processing of the Mark Intensity fields within a particular Multiple Choice field. For example, in an embodiment, if one Mark Intensity field is considered Marked, another field is considered an Erasure, and the other fields are considered empty, the Processing module may decide that the Marked field is the examinee's selection for the Multiple Choice question. However, if the assessment examination allows for multiple answers to a question, the Processing module may determine whether the Erasure field surpasses a threshold level of darkness in order to select it as an additional answer. In an embodiment, the threshold level may be dependent upon the darkness level of the Marked field. Furthermore, a rule for an assessment examination may determine whether an Erasure is considered to be an examinee's intended selection when all other fields are Empty. The Processing module may use heuristical models to make determinations on which Mark Intensity field is the examinee's choice, such as "the darkest field wins." Thresholds and heuristics may be adjusted depending upon the rules for an assessment examination.

Upon determining 1155 one or more answer selections for the Multiple Choice field pertaining to an answer area 210, a confidence level may be assigned 1160 to the answer area 210.

Accuracy is a critical component of any assessment delivery system. Since answer sheets are printed, handed out to examinees, marked on, and scanned into a computer-readable storage medium, it is not realistic to expect pristine images with precise answer marks for every answer sheet. Quality control techniques, such as confidence levels, which are described below, may be implemented to ameliorate any problems that occur during the printing, administration or scanning of the answer sheets.

Each field determination made by the Processing module or corner mark determination made by the Registration module may be assigned a confidence level to indicate how likely it is that the Processing or Registration module correctly interpreted the field. For example, if the Registration module requires a large number of passes to determine the location of a corner mark 225, a lower confidence value may be assigned than if the Registration module determines the corner mark 225 in fewer passes.

Mark Intensity fields may assign confidence values based on how close the darkness level of the field is to a calibrated level for either the empty calibration mark or the filled calibration mark. As the darkness level of the Mark Intensity field approaches one of these calibrated levels, a higher confidence level may be assigned. Erasures may not necessarily have low confidence levels. For example, a darkness level for a Mark Intensity field that is precisely half way between the thresholds for Empty and Marked fields may have a high confidence level that the field is an Erasure. However, fields with darkness levels near the threshold boundaries between Empty/Marked and Erasure may have low confidence levels.

A similar process may be used to assign a confidence level to a Multiple Choice field. For example, if one Mark Intensity field is considered to be Marked and all other fields are considered to be Empty, the Multiple Choice field may be assigned a high confidence level that the Marked field is the examinee's selection. If all Mark Intensity fields are considered to be Empty, a high confidence level that the examinee did not select an answer may be assigned to the Multiple Choice field. Conversely, a Multiple Choice field having two fields considered to be Erasures, where one is darker than the other, may be assigned a low confidence value.

Assigning confidence values may be used to alert test and/or system administrators to fields where accuracy problems exist. Accordingly, high confidence determinations may be bypassed quickly in order to focus exclusively on the fields that presented the greatest difficulty to the Processing and Registration modules. The process of correcting a misinterpretation is called a Resolution.

In an embodiment, a threshold may be set at which fields having confidence levels below the threshold are flagged for review by an administrator. Such fields may be designated with, for example, a question mark or an exclamation point, such as in FIG. 12. Such designations may alert an administrator to review the relevant information concerning the field. In an embodiment, an administrator can view the scanned image to determine if a Resolution is appropriate and can override the determination of the Processing module using, for example, a drop down menu.

Figure 12:
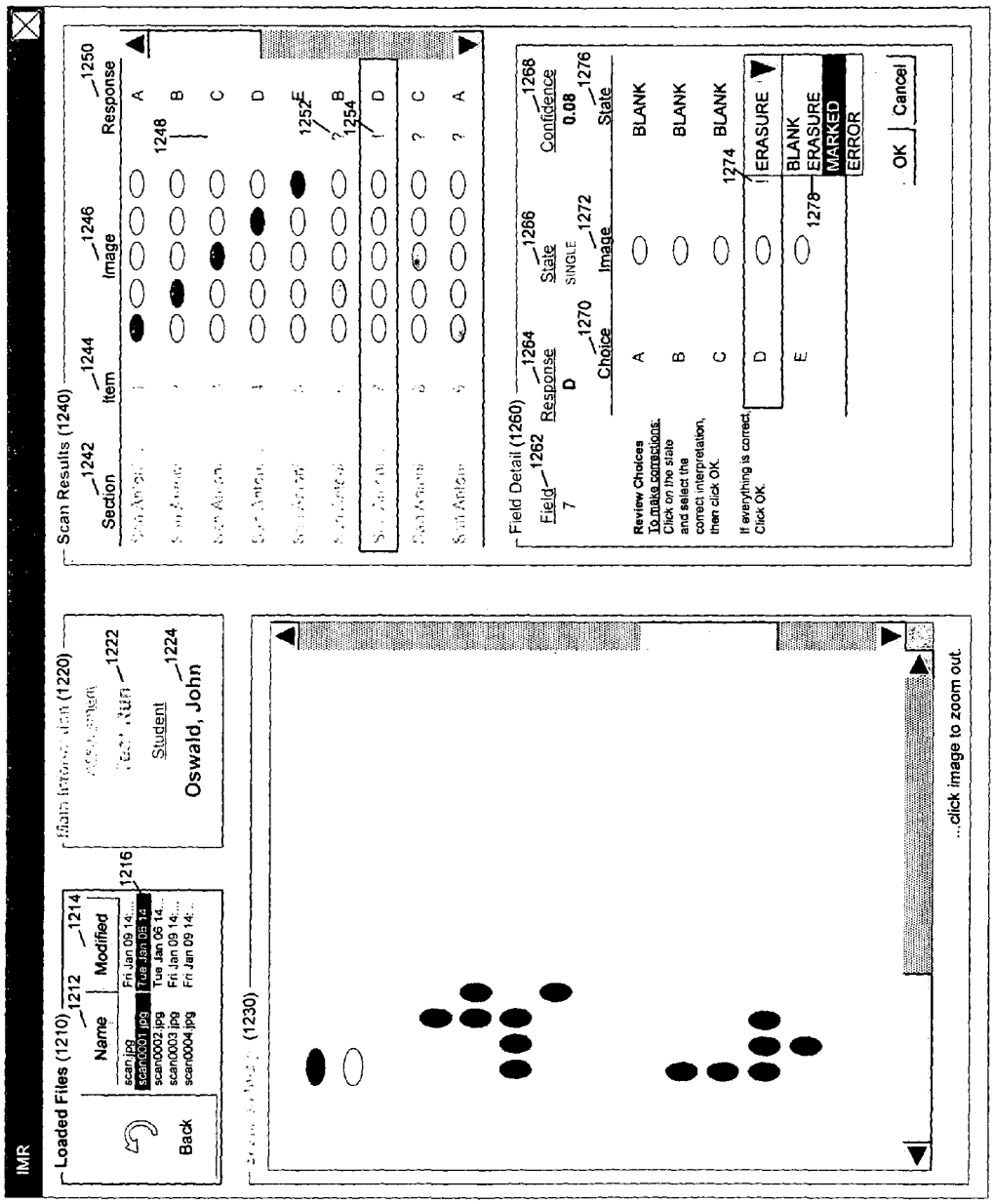
FIG. 12 depicts an exemplary graphical user interface used to assist in scoring an assessment examination according to an embodiment.

FIG. 12 depicts an exemplary graphical user interface used to assist in scoring an assessment examination according to an embodiment. The graphical user interface may include a window having a plurality of panes. In the embodiment shown in FIG. 12, the panes include a loaded files pane 1210, an information pane 1220, a scanned image pane 1230, a scanned results pane 1240, and a field detail pane 1260.

The loaded files pane 1210 may include a list of one or more scanned images that are stored in a computer-readable storage medium accessible by the graphical user interface. In an embodiment, each file listing includes a file name 1212 and a time when the file was last modified 1214. A file listing 1216 may be highlighted when a user is accessing the file.

The information pane 1220 may include information pertaining to the loaded assessment examination 1216 and/or the examinee for the selected file. In an embodiment, an assessment examination name 1222 and an examinee name 1224 are displayed.

The scanned image pane 1230 may include an image of at least a portion of the loaded assessment examination 1216. In an embodiment, the user may zoom into the image to view particular portions of the assessment examination 1216 more closely. In FIG. 12, the image is zoomed in on the calibration marks 230, the form identifier 235 and the examinee identifier 240 for the loaded assessment examination 1216. Alternately, the user may zoom in on a particular answer area 210 to determine whether a determination by the Processing module for the answer area 210 is proper.

The scan results pane 1240 may include a listing for each answer area 210 for the loaded assessment examination 1216. Each listing may include a section name 1242, an item number 1244, a cropped image of the answer area 1246, a confidence level indicator 1248 and a determined response 1250. The section name column 1242 may include the name for the section assigned to a listed assessment item during the answer sheet creation process described above in reference to FIGS. 1-6. The graphical user interface may determine a section name 1242 based on the field pertaining to the section in the form document associated with the loaded assessment examination 1216.

The item number column 1244 may list the item number for each listed assessment item. The graphical user interface may determine an item number 1244 based on the field pertaining to the assessment item in the form document associated with the loaded assessment examination 1216.

The cropped image of the answer area column 1246 may display an image of the answer area 210 for each listed assessment item. A cropped image 1246 may be used to determine whether the Processing module-designated response is proper for the listed assessment item. A cropped image 1246 may be generated for each assessment item based on the parameters assigned to the assessment item in the form document associated with the loaded assessment examination 1216.

The confidence level indicator column 1248 may list a designator for an assessment item if the response determined by the Processing module has a pre-determined confidence level. In an embodiment, a high confidence level for a particular assessment item may result in no confidence level indicator 1248 being displayed for that assessment item. In contrast, one or more designators may be used for lower confidence levels. In an embodiment, a question mark 1252 may be used if the confidence level is below a first threshold, and an exclamation point 1254 may be used if the confidence level is below a second threshold that is, for example, less than the first threshold.

The determined response column 1250 may include a listing of each response determined by the Processing module. A determined response may represent the most likely selection by an examinee based on the darkness levels of each answer space 220 for the particular assessment item.

When a particular assessment item is selected in the scan results pane 1240, the field detail pane 1260 may display additional detail pertaining to the assessment item. In an embodiment, the field detail pane 1260 may include the assessment item number 1262, the determined response 1264 for the assessment item, a state 1266 for the assessment item, a confidence level 1268 for the assessment item, and a table containing a listing for each potential response including an answer space name 1270, a cropped image 1272 for the answer space 220, an answer space confidence level indicator 1274, and an answer space state 1276. The assessment item number 1262 may correspond to the value in the item number column 1244 for the selected assessment item. The determined response 1264 may correspond to the value in the determined response column 1250 for the selected assessment item. The state 1266 may correspond to the rule that was applied to the assessment item by the Processing module. In FIG. 12, the SINGLE state may correspond to a single answer space 220 having a non-Empty value. The confidence level 1268 may be the value that the Processing module computes for the assessment item.

In an embodiment, the table in the field detail pane 1260 may list entries for each answer space 220. The answer space name 1270 and the cropped image 1272 for the answer space 220 may be generated from the field corresponding to the answer space 220 in the form document pertaining to the assessment examination. In an embodiment, a high confidence level for a particular assessment item may result in no confidence level indicator 1274 being displayed for that assessment item. In contrast, one or more designators may be used for lower confidence levels. In an embodiment, a question mark may be used if the confidence level is below a first threshold, and an exclamation point may be used if the confidence level is below a second threshold that is less than the first threshold. The answer space state 1276 may initially include the state (e.g., Blank, Erasure, Marked or Error) assigned to the associated answer space 220 by the Processing module. In an embodiment, when an answer space listing is selected, a user may modify the value for that answer space state 1276. For example, as shown in FIG. 12, the user is modifying the value of the answer space state 1276 for answer space "D" from Erasure to Marked using a pull down menu 1278.

Figure 13:
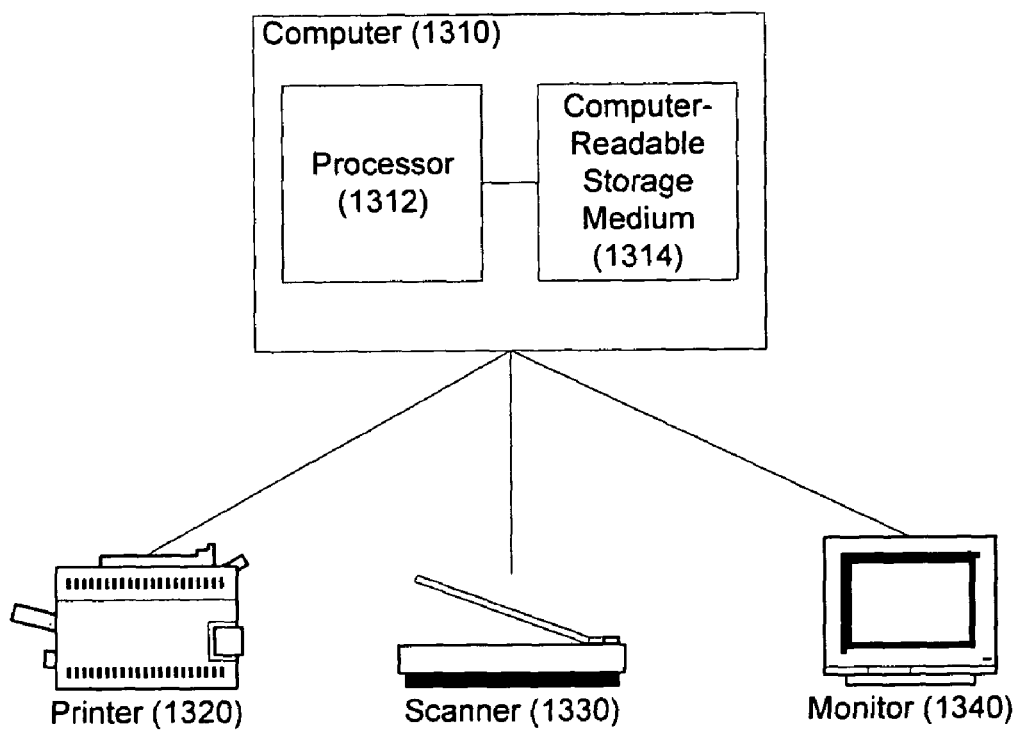
FIG. 13 depicts an exemplary system for generating and scoring assessment examinations according to an embodiment.

FIG. 13 depicts an exemplary system for generating and scoring assessment examinations according to an embodiment. In FIG. 13, a computer 1310 is operably connected to each of a printer 1320, a scanner 1330 and a display 1340. The computer may include, without limitation, a processor 1312 and a computer-readable storage medium 1314, such as a hard drive, a floppy diskette, a CD, a DVD or the like. The computer-readable storage medium 1314 may contain one or more computer instructions for implementing the methods described above. Additionally or alternatively, the computer-readable storage medium 1314 may contain scanned images in a digital format. The printer 1320 may receive instructions from the computer 1310 to print an answer sheet according to the methods described above. The scanner 1330 may receive instructions from the computer 1310 to scan a completed answer sheet according to the methods described above. The display 1340 may display the graphical user interface described above. The computer 1310 may be connected to one or more of the printer 1320 and scanner 1330 by a cable, an intranet or the Internet. In an embodiment, the printer 1320 and the scanner 1330 may be combined into a single printer/scanner combination device.

While the present invention has been described in conjunction with particular applications as outlined above, it is evident that many alternatives, modifications and variations will be apparent to one of ordinary skill in the art. Accordingly, the particular applications of this invention as set forth above are intended to be illustrative, not limiting. Modifications or changes may be made without departing from the spirit or scope of the invention, or may become obvious to one skilled in the art after review of the present invention. Such modifications or changes are intended to be included within the scope of this present application.

What is claimed is:

1. A processor-implemented method for generating and processing an assessment examination, the method comprising:
scanning a completed assessment examination answer sheet having one or more answer choices for each of a plurality of questions on an assessment examination to produce a scanned image of the completed assessment examination answer sheet;
automatically determining using a processing system an answer value and an answer confidence level for each answer choice from the scanned image by:
determining using the processing system a first value based on a light calibration mark intensity for a light calibration mark on the scanned image of the completed assessment examination answer sheet;
determining using the processing system a second value based on a dark calibration mark intensity for a dark calibration mark on the scanned image of the completed assessment examination answer sheet;
generating using the processing system at least one range based on the first value and the second value; and
for each answer choice:
determining a third value based on an answer choice intensity,
determining an answer value for the answer choice based on a range encompassing the third value, and
determining an answer confidence level based on a position of the third value within the encompassing range;
automatically determining using the processing system a proposed answer for each question based on the answer value and the answer confidence level for each answer choice pertaining to the question;
displaying using the processing system proposed answers for review by a user for one or more questions using a graphical user interface; and
recording a final answer value for each question based on the reviewed proposed answers.

2. The method of claim 1 wherein the answer confidence level varies according to at least one of:
a number of passes required to locate a corner mark,
a number of answer choices marked,
whether multiple answer choices are marked with different darknesses for a single question.

3. The method of claim 1 wherein the answer confidence level varies according to nearness of an answer choice darkness level to a midpoint between a light calibration mark darkness and a dark calibration mark darkness.

4. The method of claim 1, further comprising:
if the answer confidence level for an answer choice is within a numerical range, marking the answer choice with an answer confidence level indicator in the graphical user interface.

5. The method of claim 1, further comprising:
determining a question confidence level for each question based on the answer confidence levels and the proposed answer for the question.

6. The method of claim 5, further comprising:
if the question confidence level for a question is within a numerical range, marking the question with a question confidence level indicator in the graphical user interface.

7. The method of claim 5 wherein the graphical user interface displays the questions on the assessment examination in an order based on the question confidence level for each question.

8. The method of claim 7 wherein the graphical user interface displays the questions in order from a question having the lowest question confidence level to a question having the highest question confidence level.

9. The method of claim 1, wherein the light and dark calibration marks are ovals of similar size as answer choice selection areas.

10. A computer-implemented graphical user interface for reviewing answers to an assessment examination, the graphical user interface comprising:
- a question frame,
- wherein the question frame comprises one or more question images and a question confidence level indicator for at least one question image, the question confidence level indicator being displayed to a user for aiding in identifying whether a question is properly scored,
- wherein each question image comprises an image of one or more answer choices pertaining to a question from an assessment examination answer sheet,
- wherein the question confidence level indicator is displayed if a question confidence level for the question is within a range,
- wherein the question confidence level is determined based on answer confidence levels and a proposed answer for the question; and
- an answer frame,
- wherein the answer frame comprises one or more answer choice images and an answer confidence level indicator for an answer choice image, the indicator displayed if the answer confidence level for the answer choice image is within a range,
- wherein each answer choice image comprises an image of an answer choice from a selected question in the question frame,
- wherein the answer confidence level is determined based on a position of the answer value within an encompassing intensity level range of the answer choice;
- wherein the intensity level range is determined based on a plurality of calibration marks on the assessment examination answer sheet.

11. The graphical user interface of claim 10 wherein the answer confidence level varies according to at least one of:
- a number of passes required to locate a corner mark,
- nearness of an answer choice darkness level to a midpoint between a light calibration mark darkness and a dark calibration mark darkness,
- a number of answer choices marked,
- whether multiple answer choices are marked with different darknesses for a single question.

12. The user interface of claim 10, wherein a plurality of question confidence level indicators are displayed simultaneously with a plurality of question images.

13. The user interface of claim 10, wherein a first question confidence level indicator is displayed with a question image if a question confidence level associated with the question image is below a first threshold and above a second threshold;
- wherein a second question confidence level indicator is displayed with a question image if a question confidence level associated with the question image is below the second threshold.

14. A system for processing an assessment examination using a computer system, the system comprising:
- a processor;
- a computer-readable storage medium in communication with the processor;
- a scanner in communication with the processor; and
- a display in communication with the processor, wherein the computer-readable storage medium contains one or more programming instructions for performing a method for processing an assessment examination using a computer system, the method comprising:
  - scanning, using the scanner, a completed assessment examination answer sheet having one or more answer choices for each of a plurality of questions on an assessment examination to produce a scanned image of the completed assessment examination answer sheet,
  - storing the scanned image in the computer-readable storage medium,
  - automatically determining, using the processor, an answer value and an answer confidence level for each answer choice from the scanned image by:
    - determining a first value based on a light calibration mark intensity for a light calibration mark on the scanned image of the completed assessment examination answer sheet,
    - determining a second value based on a dark calibration mark intensity for a dark calibration mark on the scanned image of the completed assessment examination answer sheet,
    - generating one or more ranges based on the first value and the second value, and
    - for each answer choice:
      - determining a third value based on an intensity of the answer choice,
      - determining an answer value for the answer choice based on a range encompassing the third value, and
      - determining an answer confidence level based on a position of the third value within the encompassing range,
  - automatically determining, using the processor, a proposed answer for each question based on the answer value and the answer confidence level for each answer choice pertaining to the question,
  - displaying, via a graphical user interface displayed on the display, proposed answers for review by a user for one or more questions, and
  - recording a final answer value for each question based on the reviewed proposed answers.

15. The system of claim 14 wherein the answer confidence level varies according to at least one of:
- a number of passes required to locate a corner mark,
- a number of answer choices marked,
- whether multiple answer choices are marked with different darknesses for a single question.

16. The system of claim 14 wherein the answer confidence level varies according to nearness of an answer choice darkness level to a midpoint between a light calibration mark darkness and a dark calibration mark darkness.

17. The system of claim 14 wherein the computer-readable storage medium further contains one or more programming instructions for, if the answer confidence level for an answer choice is within a range, marking the answer choice with an answer confidence level indicator in the graphical user interface.

18. The system of claim 14 wherein the computer-readable storage medium further contains one or more programming instructions for determining a question confidence level for each question based on the answer confidence levels and the proposed answer for the question.

19. The system of claim 18 wherein the computer-readable storage medium further contains one or more programming instructions for, if the question confidence level for a question is within a range, marking the question with a question confidence level indicator in the graphical user interface.

20. The system of claim 18 wherein the graphical user interface displays the questions on an assessment examination in an order based on the question confidence level for each question.

21. The system of claim 20 wherein the graphical user interface displays the questions in order from a question having the lowest question confidence level to a question having the highest question confidence level.

22. A non-transitory computer readable medium for generating and processing an assessment examination, the computer readable medium comprising programming instructions which, when executed by a processing system, cause the processing system to execute steps comprising:

automatically determining an answer value and an answer confidence level for each answer choice from a scanned image of a completed assessment examination answer sheet, the answer sheet having one or more answer choices for each of a plurality of questions on an assessment examination, by:

determining a first value based on a light calibration mark intensity for a light calibration mark on the scanned image of the completed assessment examination answer sheet, determining a second value based on a dark calibration mark intensity for a dark calibration mark on the scanned image of the completed assessment examination answer sheet, generating at least one range based on the first value and the second value, and for each answer choice:

determining a third value based on an answer choice intensity, determining an answer value for the answer choice based on a range encompassing the third value, and determining an answer confidence level based on a position of the third value within the encompassing range;

automatically determining a proposed answer for each question based on the answer value and the answer confidence level for each answer choice pertaining to the question;

displaying proposed answers for review by a user for one or more questions using a graphical user interface; and recording a final answer value for each question based on the reviewed proposed answers.

23. The non-transitory computer readable medium of claim 22, wherein the answer confidence level varies according to at least one of:

a number of passes required to locate a corner mark, a number of answer choices marked, whether multiple answer choices are marked with different darknesses for a single question.

24. The non-transitory computer readable medium of claim 22, wherein the answer confidence level varies according to nearness of an answer choice darkness level to a midpoint between a light calibration mark darkness and a dark calibration mark darkness.

* * * * *